United States Patent
Frobert et al.

(10) Patent No.: US 11,008,924 B2
(45) Date of Patent: May 18, 2021

(54) ON-BOARD VEHICLE EMISSIONS MEASUREMENT SYSTEM WITH A SENSOR AND A COMPUTER SYSTEM

(71) Applicant: IFP Energies nouvelles, Rueil-Malmaison (FR)

(72) Inventors: Arnaud Frobert, Rueil-Malmaison (FR); Gilles Corde, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 166 days.

(21) Appl. No.: 16/271,984

(22) Filed: Feb. 11, 2019

(65) Prior Publication Data

US 2019/0271254 A1 Sep. 5, 2019

(30) Foreign Application Priority Data

Feb. 16, 2018 (FR) ..................... 18/51.330

(51) Int. Cl.
*F01N 11/00* (2006.01)
*F02D 41/14* (2006.01)
(Continued)

(52) U.S. Cl.
CPC ........ *F01N 11/007* (2013.01); *F02D 41/1439* (2013.01); *F02D 41/266* (2013.01);
(Continued)

(58) Field of Classification Search
CPC .. F01N 11/007; F02D 41/1439; F02D 41/266; F02D 41/1451; F02D 41/1454; F02D 41/1463; F02D 41/28; F02D 41/1466; F02D 41/0072; F02D 41/1452; F02D 2041/1417; F02D 2041/1423;
(Continued)

(56) References Cited

U.S. PATENT DOCUMENTS

2005/0267669 A1 12/2005 Wang et al.
2013/0098004 A1* 4/2013 Levin .................... B01F 5/0473
60/295
(Continued)

FOREIGN PATENT DOCUMENTS

DE 10 2010 046 491 A1 3/2012
DE 10 2013 206 308 A1 10/2014
(Continued)

OTHER PUBLICATIONS

International Search Report dated Dec. 13, 2018.
Written Opinion dated Feb. 16, 2018.

*Primary Examiner* — Audrey K Bradley
*Assistant Examiner* — Dapinder Singh
(74) *Attorney, Agent, or Firm* — Fitch, Even Tabin & Flannery LLP

(57) ABSTRACT

The present invention is an on-board vehicle emissions measurement system. The system comprises at least one sensor (CAP) downstream from the aftertreatment system, and optionally a sensor plugged into the vehicle diagnostics port, and a computer (SIN) including models (MOD VEH, MOD MOD, MOD POT). According to the invention, emissions determination is based on the signal from sensor (CAP) and on models (MOD VEH, MOD MOT, MOD POT).

25 Claims, 2 Drawing Sheets

(51) Int. Cl.
*F02D 41/26* (2006.01)
*G01M 15/10* (2006.01)
*G01N 21/33* (2006.01)
*B60K 13/04* (2006.01)
*G01N 21/3504* (2014.01)
*F02D 41/28* (2006.01)
*F02D 41/00* (2006.01)

(52) U.S. Cl.
CPC ........ *G01M 15/102* (2013.01); *G01M 15/104* (2013.01); *B60K 13/04* (2013.01); *F02D 41/0072* (2013.01); *F02D 41/1451* (2013.01); *F02D 41/1452* (2013.01); *F02D 41/1454* (2013.01); *F02D 41/1463* (2013.01); *F02D 41/1466* (2013.01); *F02D 41/28* (2013.01); *F02D 2041/1417* (2013.01); *F02D 2041/1423* (2013.01); *F02D 2041/1436* (2013.01); *F02D 2200/101* (2013.01); *F02D 2200/1002* (2013.01); *F02D 2200/501* (2013.01); *F02D 2200/701* (2013.01); *G01N 21/33* (2013.01); *G01N 21/3504* (2013.01)

(58) Field of Classification Search
CPC ....... F02D 2041/1436; F02D 2200/701; F02D 2200/101; F02D 2200/501; F02D 2200/1002; B60K 13/04; G01M 15/102; G01M 15/104; G01N 21/33; G01N 21/3504
USPC .......... 60/274, 277, 285, 297, 299–301, 311, 60/286, 295
See application file for complete search history.

(56) References Cited

U.S. PATENT DOCUMENTS

| | | | |
|---|---|---|---|
| 2014/0326049 | A1* | 11/2014 | Zelepouga ............. G01N 21/85 73/31.06 |
| 2017/0080931 | A1* | 3/2017 | D'Amato .............. B60W 30/16 |
| 2017/0268445 | A1* | 9/2017 | Klinder ............... F02D 41/0002 |
| 2017/0270617 | A1* | 9/2017 | Fernandes ................ G07C 5/00 |
| 2018/0094564 | A1* | 4/2018 | Okamoto ........... G01N 27/4067 |
| 2019/0138669 | A1* | 5/2019 | Thibault ............. F02D 41/1465 |

FOREIGN PATENT DOCUMENTS

| | | |
|---|---|---|
| FR | 3049653 A1 | 10/2017 |
| WO | 02/08582 A1 | 1/2002 |
| WO | 2017/174239 A1 | 10/2017 |

* cited by examiner

ON-BOARD VEHICLE EMISSIONS MEASUREMENT SYSTEM WITH A SENSOR AND A COMPUTER SYSTEM

CROSS REFERENCE TO RELATED APPLICATIONS

Reference is made to French Application No. 18/51.330 filed Feb. 16, 2018, which is incorporated herein by reference in its entirety.

BACKGROUND OF THE INVENTION

Field of the Invention

The present invention relates to on-board vehicle emissions measurement systems.

Description of the Prior Art

Real-world private car pollution emissions are a matter of concern to the general public and to lawmakers. Indeed, the latest cases (Dieselgate and its developments) have inopportunely discredited the car industry by showing that car manufacturers had been dishonest over emissions control. It has been proven that different settings had been used for homologation and in real-world use.

In order to address these concerns and to avoid more scandals, the homologation standard has changed by bringing it closer to reality (WLTC cycle: Worldwide harmonized Light vehicles Test Procedures) and by systematically comparing the emissions obtained under laboratory conditions and under real conditions (RDE: Real Driving Emissions). Measurement systems that can be taken on board at least one of a private car and a transport vehicle have therefore been developed. These devices, which are referred to as PEMS (Portable Emission Measurement System), are expensive, fragile and require significant maintenance work because they must meet the precision criteria defined by the standard. They are thus designed to be used only by specialists, either during the development of a vehicle or upon homologation.

Moreover, emissions determination methods using models and no sensors have been developed. French Patent application 3,049,653 (WO-17,174,239) describes such a model-based method. Although satisfactory in terms of speed, ease of use and representativeness (the models are built with parameters of the vehicle), the method described in this patent application is not perfectible for certain vehicle types.

To overcome these drawbacks, the present invention concerns an on-board vehicle emissions measurement system. The system comprises at least one sensor downstream from the aftertreatment system, and optionally a sensor plugged into the vehicle OBD (On-Board Diagnostics) port, and a computer including models. According to the invention, pollutant emissions determination is based on the signal from the sensor and on the models. Using models that are based on use of the signal of at least one sensor allows to obtain precise and representative emissions determination. Furthermore, using models enables the number of sensors to be limited, which allows limitation of the cost and the maintenance of the on-board measurement system, and provides simplicity of use.

SUMMARY OF THE INVENTION

The invention relates to an on-board vehicle emissions measurement system, with the vehicle comprising an internal-combustion engine and an aftertreatment system for the exhaust gas of the engine. The on-board system includes at least one sensor downstream from the aftertreatment system of the vehicle and a computer system for determining the pollution emissions of the vehicle by implementing a model of the vehicle, a model of the engine type of the vehicle and an aftertreatment model of the vehicle. The vehicle model relates at least one of position, altitude and speed of the vehicle to the torque and to the speed of the engine. The engine type model relates the torque and the speed of the engine to the emissions at the outlet of the engine. The aftertreatment model relates the emissions at the outlet of the engine to the emissions at the outlet of the aftertreatment system. The models of the computer system accounts for of a signal coming from the at least one sensor in order to determine the pollution emissions of the vehicle.

According to an embodiment, the computer system comprises a smartphone.

Advantageously, the at least one sensor communicates with the smartphone by a wireless connection.

Preferably, the models of the computer system are stored in the cloud with the smartphone being configured to communicate with the cloud.

Advantageously, the smartphone measures at least one of the position, the altitude and the speed of the vehicle to determine the pollution emissions by use of the models.

According to an embodiment, the computer system records the emissions determined by use of the models.

According to an aspect of the invention, on-board measurement system further comprises a sensor plugged into the diagnostics port of the vehicle.

According to a feature, the at least one sensor is selected from a nitrogen oxides NOx sensor, a carbon monoxide CO sensor, a carbon dioxide $CO_2$ sensor, a dioxygen $O_2$ sensor, an unburned hydrocarbon sensor, and a particle sensor.

Advantageously, the nitrogen oxides NOx sensor is selected from among an electrochemical sensor, an ultraviolet UV sensor, an infrared IR sensor, and a chemiluminescence detector CLD.

Preferably, the carbon monoxide CO sensor or the carbon dioxide $CO_2$ sensor is selected from among an ultraviolet UV sensor or an infrared IR sensor.

According to an aspect of the invention the dioxygen $O_2$ sensor is selected from among an electrochemical sensor, a laser diode measurement sensor and a paramagnetic sensor, a magneto-pneumatic sensor.

Advantageously, the particle sensor is selected from among a corona discharge counter, an optical opacimeter, a particle accumulation sensor, a butanol vapor counter, a particle irradiation counter, an optical or ionic smoke detector, a beta attenuation BAM sensor, and a laser particle counter.

Preferably, the on-board system comprises a nitrogen oxide NOx sensor and a carbon dioxide $CO_2$ sensor.

According to an embodiment, the models are responsive to the signal coming from the at least one sensor through calibration of the models by comparison of the emissions determined by the models with the emissions being measured by the at least one sensor.

Advantageously, calibration is carried out by at least one of a least-squares solution method and a Kalman filter.

According to an implementation, the computer system is further configured to determine a descriptive parameter of the route of the vehicle.

According to a feature, the models further depend on at least one macroscopic parameter of the vehicle.

Advantageously, the system comprises acquires at least one macroscopic parameter from at least one of a database and an interface with a user.

BRIEF DESCRIPTION OF THE DRAWINGS

Other features and advantages of the system according to the invention will be clear from reading the description hereafter of embodiments given by way of non-limitative example, with reference to the accompanying figures wherein.

DETAILED DESCRIPTION OF THE INVENTION

Figure 1:
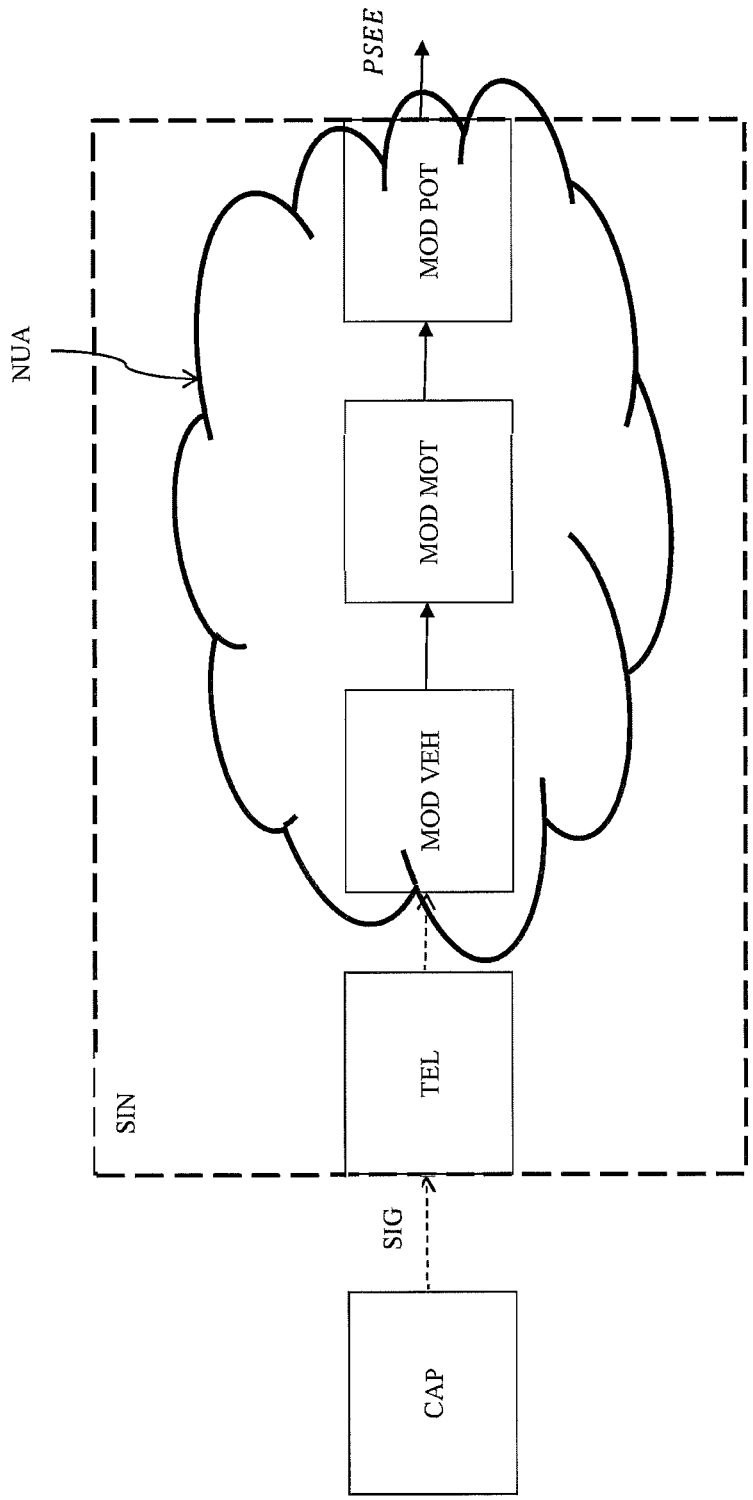
FIG. 1 illustrates the on-board measurement system according to a first embodiment of the invention.

The present invention relates to an on-board vehicle pollutant emissions measurement system.

The pollutants are understood to be nitrogen oxides (NOx), particles, carbon monoxides (CO), carbon dioxides ($CO_2$), and unburned hydrocarbons (HC). The system according to the invention allows determination of the emissions of at least one, advantageously more than one pollutant and preferably all of these pollutants.

The vehicle comprises an internal-combustion engine (referred to as the engine hereafter) and an aftertreatment system for the exhaust gas of the engine. The internal-combustion engine can be a gasoline engine or a diesel engine. The engine can achieve propulsion of the vehicle alone or it can be part of a hybrid propulsion system. The aftertreatment system allows treatment of the pollutant emissions at the engine exhaust, which reduces the vehicle emissions. The aftertreatment system can include at least one of a three-way catalyst for simultaneously treating the unburned hydrocarbons, the carbon monoxide and the nitrogen oxides, and an oxidation catalyst for treating the unburned hydrocarbons and the carbon monoxide, DeNOx catalysts for reducing the nitrogen oxides in the presence of oxygen, and filters for removing solid particles.

The term "on-board" indicates that the system is mounted on board the vehicle, which also implies that the system can be attached outside the vehicle.

The on-board measurement system can be used for motor vehicles. However, it can also be used in road transport, two-wheelers, in the rail sector, the naval sector, the aeronautics sector, for hovercraft and amphibious vehicles, etc.

The on-board measurement system according to the invention comprises:
- at least one sensor at the outlet of the aftertreatment system, which is is designed to measure an amount of gas or particles at the aftertreatment system outlet;
- a computer system for determining pollution emissions, which therefore executes three waterfall models (in series) which are:
  - a vehicle model relating at least one of position, altitude and speed of the vehicle to engine torque and speed;
  - an engine type model relating the engine torque and speed to the pollution emissions at the engine outlet; and
  - an aftertreatment model relating the pollution emissions at the engine exhaust to the pollution emissions at the aftertreatment system outlet.

According to the invention, the three models of the computer system are responsive to a signal from the sensor(s) for determining the emissions of the vehicle and models adjusted with the measurements.

Using the models and at least one sensor enables precise and representative determination of the pollution emissions; including measurements obtained from a sensor which allow precise calibration of the models. Furthermore, using the models allows limiting the number of sensors, which reduces the cost and the maintenance phases of the measurement system, and make the system easy to transport and adaptable to any vehicle type.

Having models adjusted with measurements from the sensor(s) of the system according to the invention allows operation of the models under at least one of conditions and driving profiles, without a sensor, while providing precise results.

Optionally, the on-board measurement system can comprise a sensor that is plugged into the OBD (On-Board Diagnostics) port of the vehicle and can recover values such as the engine speed, the engine temperature, the water temperature or the vehicle speed. In the rest of the description below, this sensor is referred to as OBD sensor. The computer can then be designed to be responsive to the values obtained by the OBD sensor. These parameters are used to adjust the models.

According to an embodiment of the invention, the computer system of the on-board measurement system can comprise a smartphone. Such a smartphone provides ease of installation in the vehicle, adaptability, transportability, and cost reduction in relation to a dedicated computer or calculator. Furthermore, a smartphone allows the system to be used by a wide audience.

In order to facilitate mounting in the vehicle (absence of specific wires), the sensor(s) can communicate with the smartphone by a wireless connection, of wifi or Bluetooth type for example. When appropriate, the OBD sensor can also communicate with the smartphone via a wireless connection. In a variant, a wired connection can be provided between the sensor and the smartphone or a computer or a calculator.

Besides, the three models of the computer system can be stored in a cloud or an online storage service. This allows limitation of the memory utilized by the smartphone and the use of more robust processors to execute the three models. For this configuration, the smartphone is configured to exchange with the cloud by an internet connection. This configuration using both a smartphone and a cloud enables simplified use at a reduced cost.

If the smartphone is equipped with a geolocation system (GPS), it can also be configured to measure at least one of the speed, and the altitude and the position of the vehicle. This position, speed and altitude data can be used in the models of the computer system, in particular in the vehicle model.

In a variant (for example if the smartphone is not provided with a geolocation system), the on-board system can comprise a geolocation sensor that communicates with the smartphone.

According to another aspect, the computer system can further comprise a display of the pollution emissions determined by use of the models in order to inform the vehicle user of the emissions. For example, the display can be the screen of a smartphone.

Alternatively to the smartphone, the computer system can comprise a processor or a computer that communicates with the sensor(s). The processor or computer can include the three models.

According to an aspect of the invention, the computer can comprise storage for recording the pollution emission values determined by the on-board measurement system. The storage can also store the models adjusted with the measurements.

For example, this storage can be included in at least one of the smartphone and in the cloud.

According to an implementation of the invention, the sensor can be selected from among an OBD sensor, a nitrogen oxide NOx sensor, a carbon monoxide CO sensor, a carbon dioxide $CO_2$ sensor, an oxygen $O_2$ sensor, an unburned hydrocarbon sensor and a particle sensor.

Preferably, the on-board measurement system comprises a carbon dioxide $CO_2$ sensor and a nitrogen oxide NOx sensor. This configuration provides a good compromise in terms of cost of the on-board system and of measured data for optimum model calibration.

In particular, the sensor(s) of the on-board measurement system can be selected from among:
  regarding the OBD sensor:
    preferably, a sensor capable of reading the information circulating on the OBD communication network of the vehicle, by use of the diagnostics port (or OBD port) arranged close to the dashboard of the vehicle;
  regarding the nitrogen oxides NOx volume sensors:
    preferably, an electrochemical sensor
    an ultraviolet UV sensor
    an infrared IR sensor, or
    a chemiluminescence detector (CLD);
  regarding the carbon monoxide or carbon dioxide $CO/CO_2$ volume sensors:
    preferably, an infrared IR sensor, or
    an ultraviolet UV sensor;
  regarding the oxygen $O_2$ volume sensors:
    preferably, an electrochemical sensor
    a laser diode measurement
    a paramagnetic sensor, or
    a magneto-pneumatic sensor;
  regarding the PM/PN/Opacity sensors:
    preferably, a corona discharge counter, an optical opacimeter, a particle accumulation sensor, a butanol vapor counter, a particle irradiation counter, an optical or ionic smoke detector, a beta attenuation BAM sensor, or a laser particle counter,
    preferably, a particle accumulation sensor,
    a corona discharge counter,
    an optical opacimeter,
    a butanol vapor counter,
    a particle irradiation counter,
    an optical or ionic smoke detector,
    a beta attenuation BAM sensor for air quality monitoring, or
    a true laser particle counter for air quality monitoring.

For accounting for the signals from the sensor(s) in the models, the computer system can be configured to perform continuous model training. According to an example, this continuous training can calibrate the models. The calibration can be performed by comparison of the pollution emissions determined by the models with the pollutant emissions measured by the sensor(s). For example, if the sensor is a nitrogen dioxide NOx sensor, the measured value can be compared with the nitrogen dioxide value determined by the models. Possible adjustment examples are mentioned below:
  adjustment of the gear ratio of the vehicle by use of an engine speed value,
  adjustment of the engine warm-up dynamics by use of an engine water temperature,
  adjustment of the fuel consumption by use of the carbon dioxide $CO_2$ value,
  in case of a diesel engine, the measurement of carbon dioxide $CO_2$ and nitrogen oxides NOx values advantageously allow adjust the burnt gas recirculation map of a burnt gas recirculation system EGR (BGR map) from a model,
  the carbon monoxide CO value allows adjustment of the light-off/warm-up models of the three-way or oxidation catalysts,
  in case of a spark-ignition engine (gasoline engine for example), the nitrogen oxides NOx value allows adjustment of light-off/warm-up of the three-way catalyst,
  the nitrogen oxides NOx value allows adjustment of the models related to the NOx reduction catalysts: NOx storage model in the case of a NOx trap, reductant (generally ammonia) injection and storage model in the case of a SCR (Selective Catalytic Reduction) catalyst,
  the measured particles value allows adjustment of the soot emission models when the engine is not provided with an exhaust gas filtration system,
  if the engine has an exhaust gas filtration system, measurement of the particles allows assessment of the filtration efficiency.

In all the aforementioned cases, having a measurement advantageously allows adjustment of the phenomenological models, and also to identify faulty or modified vehicles that drift away from the standards.

According to an aspect of the invention, the computer can be configured to perform calibration by use of at least one of a least-squares method and a Kalman filter. In both cases, the signals obtained via the model and the physical signals are compared, then the parameters of the model are modified to align the model outputs with the physical values obtained by the sensors.

According to an embodiment of the invention, the three models of the computer system can depend on macroscopic parameters of the vehicle. Thus, the models best represent the vehicle, the engine type and the aftertreatment system. A macroscopic parameter is understood to be a general characteristic relative to the vehicle, the engine or the aftertreatment system thereof. It is a constant parameter for a vehicle, corresponding to vehicle manufacturer's data. The parameter is referred to as macroscopic because it is determined at the vehicle scale, and it is not a microscopic parameter that can be determined, as in French patent application 2,984,557 (Corresponding to US published patent application 2013/0,158,967) for example, at the scale of a grid cell representing a small portion of the combustion chamber.

Macroscopic parameters can be of three types:
  parameters related to the general construction of the vehicle (for example: vehicle mass, transmission, . . . )
  parameters related to the engine (for example: injection type, displacement, engine type, . . . )
  parameters related to the aftertreatment system (for example: aftertreatment type).

According to an embodiment of the invention, it is possible to acquire at least one macroscopic parameter selected from among:
  the engine type (gasoline, diesel, . . . )
  the level of emissions standard (Euro 1, Euro 2, . . . )
  the engine displacement
  the maximum torque and the associated engine speed
  the maximum power and the associated engine speed
  the vehicle mass
  the vehicle transmission type (gearbox type and buildup, . . . )

the aftertreatment system type
the injection system type
the air loop architecture (presence/absence of burnt gas recirculation EGR, use of a turbocharger, of supercharging, . . . )
the dimensions of the wheels, etc.

According to a variant embodiment, the macroscopic parameters can be obtained from a database that lists the various vehicles in service. For example, the macroscopic parameters can be obtained by means of the registration number of the vehicle, the database associating the license plate number with the design thereof (make, model, engine type, . . . ), and comprising the macroscopic parameters of the vehicle. According to an example embodiment, the database can be stored in the cloud storage of the computer system.

Alternatively, the macroscopic parameters can be manufacturer's data provided by the user, in particular by use of an interface (a smartphone or a geolocation system for example).

According to an implementation of the invention, the on-board measurement system can be configured, by means of the computer system, to determine at least one descriptive parameter of a route travelled by the vehicle. For example, the descriptive parameter can be the route type (urban, extra-urban, etc.), the driving type (aggressive, median, smooth), the height difference, the traffic, the compliance with the RDE (Real Driving Emissions) requirements. It is thus possible to associate with each route a parameter characterizing it, as well as the pollutant emissions of the vehicle.

FIG. 1 illustrates, by way of non-limitative example, an on-board measurement system according to an embodiment of the invention. The on-board measurement system comprises a sensor CAP located at the outlet of the aftertreatment system of the vehicle (not shown). The on-board measurement system comprises a computer system SIN which includes a smartphone TEL and the cloud NUA.

In this figure, the arrows in dotted lines correspond to wireless connections between the elements. Sensor CAP transmits a signal SIG from the sensor measurement to smartphone TEL through a wireless connection and a Bluetooth connection for example. Furthermore, smartphone TEL exchanges with the cloud NUA through a wireless connection such as a GSM (Global System for Mobile communications) connection for example. The smartphone transmits signal SIG from the sensor and can transmit a geolocation measurement.

Three models are stored in cloud NUA which are a vehicle model MOD VEH, an engine model MOD MOT and an aftertreatment model MOD POT. Computer system SIN executes these three models one after the other by use of the data received by the smartphone, in order to determine the pollutant emissions PSEE. According to the invention, signal SIG of sensor CAP is used to best calibrate one of the three models.

In the rest of the description below, examples of models of the computer system of the on-board measurement system according to the invention are described by way of non-limitative example.

Notations

In the rest of the description, the following notations are used:

| | | |
|---|---|---|
| $pos_{GPS}$ | Coordinates measured by geolocation in the Lambert reference system | (m) |
| $alt_{GPS}$ | Altitude measured by geolocation | (m) |
| $v_{GPS}$ | Vehicle speed measured by geolocation | (m/s) |
| v | Vehicle speed | (m/s) |
| Ne | Estimated engine speed | (rpm) |
| Cme | Estimated engine torque | (Nm) |
| m | Vehicle mass | (kg) |
| $F_T$ | Vehicle traction force on the wheel | (N) |
| $F_{res}$ | Resultant of the friction forces undergone by the vehicle | (N) |
| $F_{slope}$ | Normal force undergone by the vehicle (gravity) | (N) |
| $F_{brk}$ | Mechanical braking force | (N) |
| α | Angle of inclination of the road | (rad) |
| a, b, c | Vehicle parameters | (—) |
| Pe | Estimated engine power | (kW) |
| $\eta_{trans}$ | Transmission efficiency | (—) |
| $R_{MTH-v}$ | Reduction ratio between the engine speed and the vehicle speed | (rpm/km/h) |
| PSME | Pollutant emissions at the engine exhaust | (g/s) |
| $PSME_i$ | Emissions of pollutant i at the engine exhaust | (g/s) |
| $PSMEi_{QS}$ | Emissions of pollutant i at the engine exhaust for a quasi-static regime | (g/h) |
| $NOx_{QS}$ | NOx mass per unit of mass of fuel | (g/kg fuel) |
| COC | Crank angle at combustion center (50% energy conversion) | (° C. A) |
| $m_{cyl}$ | Mass of air enclosed in the cylinder per cycle | (g/$10^3$ cm$^3$) |
| $m_{O2}$ | Mass of oxygen enclosed in the cylinder per cycle | (g/$10^3$ cm$^3$) |
| $a_0, a_1, a_2,$ and $a_3$ | Coefficients | (—) |
| $Soot_{QS}$ | Particle emissions at engine the exhaust in quasi-static regime | (g/s) |
| BGR | Burnt gas fraction in the cylinder | (%) |
| $BGR_{dyn}$ | Dynamic fraction of burnt gas in the cylinder | (%) |
| $AF_{ratio}$ | Mixture richness in the cylinder | (—) |
| $AF_{ratio-dyn}$ | Dynamic mixture richness in the cylinder | (—) |
| $Cor_{i-QS2TR}$ | Correction coefficient for the impact of transient phenomena for pollutant i | (—) |
| PSEE | Pollution emissions at aftertreatment system outlet | (g/s) |
| $PSEE_i$ | Emissions of pollutant i at aftertreatment system outlet | (g/s) |
| $Conv_{i,j}$ | Conversion efficiency of section j of the aftertreatment system for pollutant i | (—) |
| Téch | Exhaust gas temperature | (K) |
| Qéch | Exhaust gas flow rate | (g/s) |

For these notations, the time derivative is denoted by $$\frac{d}{dt}.$$

In the present application, term f designates a function that can be of any type. According to the invention, three macroscopic models are constructed in order to determine the pollutant emissions. These models are preferably parametrized with the acquired macroscopic parameters, thus allowing the emissions determination to be representative of the vehicle. The three models are a vehicle model, an engine model and an aftertreatment model (i.e. a model of the aftertreatment system).

Vehicle Model

The vehicle model relates at least one of the position, the altitude and the speed of the vehicle to the torque and the speed of the engine, which preferably uses a macroscopic parameter. According to an implementation of the invention, at least one of the following macroscopic parameters can be used to build the vehicle model: mass of the vehicle, maximum power and associated engine speed, maximum speed, transmission type, . . . .

According to an embodiment of the invention, the vehicle model can be built by associating a vehicle dynamics model and a vehicle transmission model. The vehicle dynamics model relates at least one of the position and the speed and the altitude of the vehicle to the estimated vehicle power by use of at least one macroscopic parameter, for example may be the mass of the vehicle, the transmission type, the dimensions of the wheels. The vehicle transmission model relates the power of the vehicle to the engine speed and torque, by use of at least one macroscopic parameter, for example the transmission type, the maximum power and the associated engine speed.

The vehicle dynamics model utilizes the dynamics of the vehicle. It can be constructed from the application of the fundamental principle of the vehicle dynamics applied on the longitudinal axis thereof, and it can be written in the form as follows:

$$m\frac{dv}{dt} = F_T - F_{res} - F_{slope} - F_{brk}$$

with:

v being the speed of the vehicle and an output of the vehicle dynamics mode.

$F_{res}$ can be expressed as a function of the speed in the form $F_{res}=a+bv+cv^2$, with a, b, c being parameters of the vehicle to be identified as a function of the general characteristics of the vehicle (macroscopic parameters of the vehicle).

$F_{slope}$ can be expressed as a function of the mass of the vehicle and of the inclination α of the road: $F_{slope}=mg\sin(\alpha)$. Angle of inclination α is an input datum of the vehicle dynamics model. Indeed, inclination α can be calculated from the altitude and the distance travelled, it therefore depends on the altitude and the position. According to an embodiment, angle of inclination α can be determined by a formula of the type:

$$\alpha = \arctan\left(\frac{\Delta\text{altitude}}{\Delta\text{distance}}\right)$$

These equations allow expressing a formula relating the estimated engine power to the vehicle speed and other known or determinable macroscopic parameters. Indeed, the following equation can be written:

$$P_e = F_T * v / \eta_{trans}$$

Thus, by combining the various equations, it is possible to determine a formula relating the engine power to the speed and the altitude of the vehicle, by use of known and constant macroscopic parameters.

The transmission model estimates the reduction ratio between the thermal engine speed and the vehicle speed. It can be parametrized as a function of the general characteristics (macroscopic parameters) of the vehicle, notably the mass of the vehicle, the maximum power, the transmission type which in particular considers the number of gears. This transmission model only uses the vehicle speed as the input for estimating the reduction ratio:

$$R_{MTH-v} = f(v)$$

Function f can be obtained notably from charts provided by the manufacturer and it can be calibrated during operation using the measurements of a sensor. For example, if need be, function f can be adjusted with a sensor plugged in the diagnostics port OBD of the vehicle.

This reduction ratio can then be used to determine the engine speed. Indeed, the following relations can be written:

$$Ne = R_{MTH-v} * v$$

The engine torque can then be determined as a function of the power (estimated by means of the vehicle dynamics model) and the speed of the engine:

$$Cme = f(Ne, Pe)$$

Function f can be obtained through maps provided by the manufacturer and it can be calibrated during operation using the measurements of a sensor.

Engine Model

The engine model relates the engine speed and torque to the pollution emissions at the engine exhaust (that is before the aftertreatment system), preferably by use of at least one macroscopic parameters. According to an implementation of the invention, the engine model can be constructed using at least one of the following macroscopic parameters: displacement, engine type, torque and power, air loop architecture, vehicle homologation standard, etc.

According to an embodiment of the invention, the engine model can be built by associating an energy model and an engine exhaust emissions model. The energy model relates the engine torque and speed to the flow rates and temperatures of fluids in the combustion engine (fuels, intake gas, exhaust gas, possibly burnt gas recirculatlon), preferably by use of at least one macroscopic parameter, for example the displacement, the engine type, the maximum torque and power, the air loop architecture. The engine outlet emissions model relates the flow rates and temperatures of fluids in the internal-combustion engine to the emissions at the engine exhaust by use of at least one macroscopic parameter, for example the vehicle homologation standard, the engine type, the air loop architecture.

The energy model allows estimation of the physical quantities at the current operating point (engine speed, torque). It is parametrized as a function of macroscopic parameters. The estimated physical quantities are the flow rates and the temperatures of the fluids used in the combustion engine (fuels, intake gas, exhaust gas, possibly burnt gas recirculation).

The engine outlet emissions model allows estimation of the pollution emissions at the engine outlet, from the engine speed and torque information and from the information obtained from the energy model. It can be parametrized as a function of the general characteristics of the vehicle and of the engine which are the vehicle homologation standard, the engine type, the air loop architecture, etc.

The emissions at the engine exhaust can be estimated in two steps:

quasi-static emissions estimation by use of a quasi-static model and estimation of the impact of transient phenomena by use of a transient model.

Alternatively, the emissions at the engine exhaust can be estimated in a single step by use of the quasi-static model.

Quasi-static emissions estimation at an engine operating point at a given time amounts to considering that this engine is operating under stabilized conditions at this operating point.

Estimating the impact of transient phenomena (non-stabilized operation) allows accounting for transient phenomena that generally generate a surplus of pollutant emissions.

Quasi-static pollutant models can be parametrized by use of macroscopic vehicle and engine parameters. They allow estimation at any time the quasi-static pollution emissions at the engine exhaust, from the thermal engine speed and torque estimations and from the outputs of the energy model. The quasi-static models can be written in the form:

$$PSME_{i\text{-}QS} = f(Ne, Cme)$$

Function f can be of a different type, depending on the pollution type being studied, and it can be calibrated during operation using the measurements of a sensor.

For example, the quasi-static NOx model can be obtained from the works of Gartner (U. Gartner, G. Hohenberg, H. Daudel and H. Oelschlegel, Development and Application of a Semi-Empirical NOx Model to Various HD Diesel Engines), and it can be written in the form:

$$\log(NOx_{QS}) = a_0 + a_1 * COC + a_2 * m_{cyl} + a_3 * m_{O2}$$

Coefficients $a_0$, $a_8$, $a_2$, and $a_3$ are obtained from experimental data and can be calibrated during operation using the measurements of a sensor, in this case a nitrogen oxides NOx sensor. One advantage of this model is that these coefficients vary little from one engine to the next. This is demonstrated in the aforementioned article by Gartner.

The particles at the engine outlet are the combination of two phenomena: formation and post-oxidation in the combustion chamber. These phenomena are influenced in the first place by the richness, the engine speed the amount of fuel and the burnt gas proportion. Thus, the static model of particles at the engine outlet can be written as an equation in the form:

$$Soot_{QS} = f(AF_{ratio}, Nc, Fuel, BGR)$$

Function f can be determined by correlation with experimental data and it can be calibrated during operation using the measurements of a sensor, a particle sensor here. Similar models can be constructed for the other pollutants (HC, CO).

For the embodiment where the impact of the transient phenomena is determined, the operation described below can further be implemented. Air loop dynamics generates a difference regarding the BGR ratio (burnt gas fraction related to the exhaust gas recirculation) and the richness in relation to the stabilized operating point, which has a strong impact on the pollutants, in particular the nitrogen oxides NOx, the hydrocarbons HC, the carbon monoxide CO and the particles. The transient impact models are parametrized as a function of macroscopic parameters of the engine, in particular recovered air loop characteristics (atmospheric/ supercharged, high-pressure burnt gas recirculation $EGR_{HP}$/ low-pressure burnt gas recirculation $EGR_{BP}$).

These models allow estimation of the burnt gas fractions and the dynamic richness from the quasi-static estimations and the estimated torque variation:

$$BGR_{dyn} = f(BGR, Cme, dCme/dt)$$

$$AF_{ratio\text{-}dyn} = f(AF_{ratio}, Cme, dCme/dt)$$

A correction coefficient for each pollutant can be calculated as a function of these dynamic quantities:

$$Cor_{i\text{-}QS2TR} = f(BGR_{dyn}, BGR, AF_{ratio\text{-}dyn}, AF_{ratio})$$

These correction coefficients allow to estimate the emissions at the engine outlet by taking account of the transient phenomena. The emissions at the engine outlet can therefore be written with a formula of the type:

$$PSME_i = Cor_{i\text{-}QS2TR} * PSME_{i\text{-}QS}$$

The signals from a carbon dioxide $CO_2$, a carbon oxide CO, a hydrocarbon HC, a nitrogen oxides NOx or a particle sensor (in particular, especially a nitrogen oxides NOx sensor and a carbon dioxide $CO_2$ sensor) can help adjust the map of a burnt gas recirculation system EGR with which the engine may be equipped.

Aftertreatment Model

The aftertreatment model relates the pollution emissions at the engine exhaust (that is before the aftertreatment system) to the pollutant emissions at the aftertreatment system outlet, preferably by use of at least one macroscopic parameter. According to an implementation of the Invention, the model can be constructed using at least one of the following macroscopic parameters: displacement, vehicle homologation standard, etc.

The aftertreatment model can comprise submodels for each depollutlon technology, which are associated depending on the depollution system architecture of the vehicle. These submodels can be parametrized as a function of macroscopic parameters of the vehicle, such as the homologation standard, the displacement, etc.

For example, the various depollutlon technologies can be:
TWC, three-way catalytic converters,
GPF (for gasoline engines), gasoline particle filter,
DOC (for diesel engines), diesel oxidation catalyst,
DPF (for diesel engines), diesel particle filter.
LNT (for diesel engines), lean NOx trap, and
SCR (for diesel engines), selective catalytic reduction.

The aftertreatment model allows estimation of the emissions at the aftertreatment system outlet from the temperature, flow rate and engine outlet emissions estimations. The aftertreatment model can be built by discretizing the aftertreatment system into sections (or layers), and through association of the efficiency $Conv_{i,j}$ of each discretized section. According to an example, the aftertreatment model can be written as follows:

$$PSEE_i = \prod_{j=1}^{Nb\ pain} Conv_{i,j}(T_{ech}, Q_{ech}) * PSME_i$$

The efficiency of the aftertreatment system sections can be determined from maps provided by the manufacturer and can be calibrated during operation using the measurements of a sensor.

Steps for Determining the Pollutant Emissions by Use of the On-Board Measurement System According to a non-limitative embodiment, the on-board measurement system can carry out the following steps for determining the emissions:

1) Sensor measurement and transmission to the smartphone
2) Geolocation measurement (optional) and transmission to the cloud
3) (optional step) Measurement preprocessing
4) Engine torque and speed determination
5) Pollutant emissions determination at the engine exhaust
6) Vehicle pollutant emissions determination
7) (optional step) Data storage.

Figure 2:
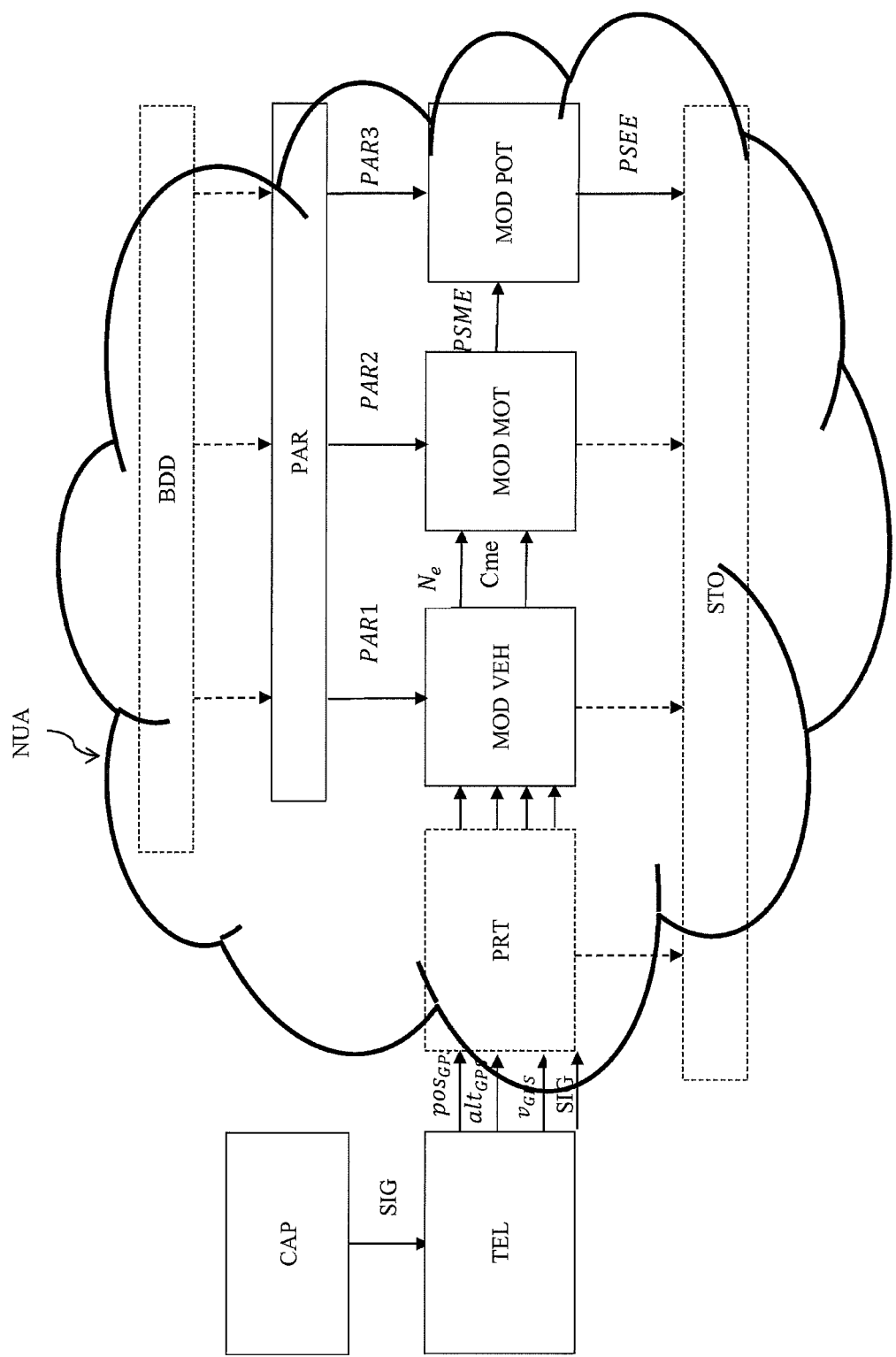
FIG. 2 illustrates the on-board measurement system according to a second embodiment of the invention.

FIG. 2 schematically illustrates, by way of non-limitative example, the steps of the method of using the on-board measurement system according to an embodiment of the Invention. In this figure, the dotted lines indicate optional elements of the method.

Prior to carrying out the steps of the method, the various models (vehicle model MOD VEH, engine model MOD MOT and aftertreatment model MOD POT) are constructed. These models are preferably constructed from macroscopic parameters PAR. Optionally, macroscopic parameters PAR can be obtained from a database BDD that lists the various vehicles in circulation. For example, macroscopic parameters PAR can be obtained via the vehicle registration number, database BDD associating the license plate number with the design of the vehicle (make, model engine type, . . . ) and comprising the macroscopic parameters of the vehicle. Database BDD can be stored in cloud NUA of the computer system.

A first series of macroscopic parameters PAR1 can be used for the construction of vehicle model MOD VEH. This first series of macroscopic parameters PAR1 can comprise the following parameters: mass of the vehicle, maximum power and associated engine speed, maximum speed, transmission type (non-limitative list).

A second series of macroscopic parameters PAR2 can be used for the construction of engine model MOD MOT. This second series of macroscopic parameters PAR2 can comprise the following parameters: displacement, engine type, maximum torque and power, air loop architecture, vehicle homologation standard (non-limitative list).

A third series of macroscopic parameters PAR3 can be used for the construction of aftertreatment model MOD POT. This third series of macroscopic parameters PAR3 can comprise the following parameters: displacement, vehicle homologation standard (non-limitative list).

These three models can be built according to one of the variant embodiments described above.

The first step carries out a measurement step with sensor CAP at the outlet of the aftertreatment system of the vehicle and then transmits this measurement (signal SIG) to the smartphone TEL. This transmission to smartphone TEL can be performed by use of a wireless connection.

The second step carries out a geolocation measurement step MES. At least one of the position $pos_{GPS}$, the altitude $alt_S$, and the speed $v_{GPS}$ of the vehicle can be measured in this step. Taking account of altitude $alt_{GPS}$ notably allows the slope of the road to be taken into account. Preferably, the three measurements are taken to provide the most precise information possible regarding geolocation of the vehicle, because the driving style and the vehicle acceleration can then be taken into account. This measurement can be made using a geolocation system, for example of GPS (Global Positioning System) or Galileo type, or by use of a smartphone, etc. In the case of a smartphone, the latter can be equipped with a geolocation system, alternatively the measurements can be achieved in other ways, notably by triangulation.

Furthermore, the second step comprises transmitting measurements to the cloud NUA from the sensor, and possibly the geolocation measurements.

The third step, which is optional, is a step of preprocessing PRT of the measurement signals. This step improves the quality of the measured signals prior to using them. It can notably be interesting if the measurements are made from a smartphone because measurements obtained with such a device can be somewhat imprecise. This preprocessing can be variable as it depends on the quality of the input data.

According to an embodiment of the invention, preprocessing PRT can comprise oversampling of the signals, then filtering. At the end of this step, preprocessed signals relative to at least one of position $pos_{GPS}$, altitude $alt_{GPS}$ and speed $v_{GPS}$ of the vehicle are thus available.

The fourth step determines the engine torque and speed. It is carried out by use of vehicle model MOD VEH, which determines torque Cme and speed Ne of the engine, as a function of the geolocation data which are at least one of position $pos_{GPS}$ altitude alt and speed $v_{GPS}$ of the vehicle. Furthermore. In this step, vehicle model MOD VEH can be calibrated by use of the signal SIG of sensor CAP in order to improve the precision of vehicle model MOD VEH.

The fifth step determines the pollutant emissions at the engine exhaust, this step is carried out by use of engine model MOD MOT, which determines the pollution emissions PSME at the engine exhaust, as a function of torque Cme and speed Ne of the engine. Furthermore, in this step, engine model MOD MOT can be calibrated by use of signal SIG of sensor CAP in order to improve the precision of engine model MOD MOT.

The sixth step determines the pollutant emissions of the vehicle, at the outlet of the aftertreatment system. Determination of emissions can be done at any time, for example at a frequency of 1 Hz. Furthermore, it is also possible to determine the cumulative emissions for a given journey. This step is carried out using aftertreatment model MOD POT, which determines the pollution emissions at the exhaust of the aftertreatment system PSEE, as a function of the emissions at the engine exhaust PSME. Furthermore, in this step, aftertreatment model MOD POT can be calibrated by use of signal SIG of sensor CAP in order to improve the precision of aftertreatment model MOD POT.

The seventh step, which is optional, relates to the data storage. Once pollutant emissions PSEE of the vehicle have been determined, they can be stored STO (recorded), in particular in a database (different from the database comprising the macroscopic parameters). This storage STO can concern only the pollutant emissions of the vehicle PSEE, but it may also concern the data determined after each step of the method including at least one of preprocessed measurements of torque Cme, speed Ne of the engine and pollution emissions at the engine exhaust PSME. This information enables monitoring of the real uses and of the associated emissions with good spatial and temporal resolution. This information can for example allow assessment of the environmental relevance of road infrastructures at the scale of a street to identify localized emission peaks for identifying the impact of the driving style on the emissions, etc. Storage STO can be contained in the cloud NUA.

This database can associate the instantaneous emissions with map data to form a red pollutant emissions map. It is thus possible to draw conclusions at the scale of a road portion, an entire journey or even a geographical zone, as appropriate. In this step, it is also possible to display the pollutant emissions at the vehicle outlet PSEE, for example on the screen of a geolocation system (GPS, Galileo), of a smartphone, on the dashboard of the vehicle, on a website, etc. It is thus possible to inform the user or any other person (for example a vehicle fleet manager, a road infrastructure manager, . . . ) of the pollution emitted during a journey or on a road.

The invention claimed is:

1. An on-board vehicle pollutant emissions measurement system including a vehicle comprising an internal-combustion engine and an aftertreatment system for exhaust gas of the engine and the on-board system including at least one sensor downstream from the aftertreatment system of the vehicle and a computer system for determining the pollutant emissions of the vehicle by implementing a vehicle model, a model of a type of the engine and an aftertreatment model of the vehicle, the vehicle model relating at least one of position, altitude and speed of the vehicle to torque and to speed of the engine, the engine model relating the torque and the speed of the engine to emissions at an outlet of the engine, and the aftertreatment model relating the emissions at the outlet of the engine to the emissions at of an outlet of the aftertreatment system, wherein the models of the computer system are responsive to a signal coming from the at least one sensor to determine pollutant emissions of the vehicle by modifying parameters of the models to align output of the models with physical values obtained by the at least one sensor.

2. The on-board measurement system as claimed in claim 1, wherein the computer system comprises a smartphone.

3. The on-board measurement system as claimed in claim 2, wherein the at least one sensor communicates with the smartphone by means of a wireless connection.

4. The on-board measurement system as claimed in claim 3, wherein the models of the computer system are stored in a cloud with the smartphone communicating with the cloud.

5. The on-board measurement system as claimed in claim 3, wherein the smartphone measures at least one of the position, the altitude and the speed of the vehicle so as to determine the pollutant emissions by use of the models.

6. The on-board measurement system as claimed in claim 2, wherein the models of the computer system are stored in a cloud with the smartphone communicating with the cloud.

7. The on-board measurement system as claimed in claim 6, wherein the smartphone measures at least one of the position, the altitude and the speed of the vehicle so as to determine the pollutant emissions by use of the models.

8. The on-board measurement system as claimed in claim 2, wherein the smartphone measures at least one of the position, the altitude and the speed of the vehicle so as to determine the pollutant emissions by use of the models.

9. The on-board measurement system as claimed in claim 1, wherein the computer system comprises a storage for storing emissions determined by use of the models.

10. The on-board measurement system as claimed in claim 1, wherein the on-board measurement system comprises a sensor coupled to a diagnostics port of the vehicle.

11. The on-board measurement system as claimed in claim 1, wherein the at least one sensor is selected from a nitrogen oxide NOx sensor, a carbon monoxide CO sensor, a carbon dioxide CO2 sensor, an oxygen O2 sensor, an unburned hydrocarbon sensor and a particle sensor.

12. The on-board measurement system as claimed in claim 11, wherein the nitrogen oxide NOx sensor is selected from an electrochemical sensor, an ultraviolet UV sensor, an infrared IR sensor, a chemiluminescence detector CLD.

13. The on-board measurement system as claimed in claim 12, wherein the carbon monoxide CO sensor or the carbon dioxide CO2 sensor is selected from among an ultraviolet UV sensor and an infrared IR sensor.

14. The on-board measurement system as claimed in claim 13, wherein the oxygen O2 sensor is selected from an electrochemical sensor, a laser diode measurement system, a paramagnetic sensor, and a magneto-pneumatic sensor.

15. The on-board measurement system as claimed in claim 12, wherein the oxygen O2 sensor is selected from an electrochemical sensor, a laser diode measurement system, a paramagnetic sensor, and a magneto-pneumatic sensor.

16. The on-board measurement system as claimed in claim 11, wherein the carbon monoxide CO sensor or the carbon dioxide CO2 sensor is selected from among an ultraviolet UV sensor and an infrared IR sensor.

17. The on-board measurement system as claimed in claim 16, wherein the oxygen O2 sensor is selected from an electrochemical sensor, a laser diode measurement system, a paramagnetic sensor, and a magneto-pneumatic sensor.

18. The on-board measurement system as claimed in claim 11, wherein the oxygen O2 sensor is selected from an electrochemical sensor, a laser diode measurement system, a paramagnetic sensor, and a magneto-pneumatic sensor.

19. The on-board measurement system as claimed in claim 11, wherein the particle sensor is selected from a corona discharge counter, an optical opacimeter, a particle accumulation sensor, a butanol vapor counter, a particle irradiation counter, an optical, an ionic smoke detector, a beta attenuation BAM sensor, and a laser particle counter.

20. The on-board measurement system as claimed in claim 11, wherein the on-board system comprises a nitrogen oxide NOx sensor and a carbon dioxide CO2 sensor.

21. The on-board measurement system as claimed in claim 1, wherein the models are responsive to a signal coming from the at least one sensor with the models being calibrated by a comparison of emissions determined by the models with the emissions being measured by the at least one sensor.

22. The on-board measurement system as claimed in claim 21, wherein the calibration is carried out by use of at least one of a least-squares method and a Kalman filter.

23. The on-board measurement system as claimed in claim 1, wherein the computer system determines a descriptive parameter of a route of the vehicle.

24. The on-board measurement system as claimed in claim 1, wherein the models further depend on at least one macroscopic parameter of the vehicle.

25. The on-board measurement system as claimed in claim 24, wherein the system acquires the at least one macroscopic parameter from at least one of a database and an interface with a user.

* * * * *